United States Patent [19]

Bahnick et al.

[11] Patent Number: 4,907,176
[45] Date of Patent: Mar. 6, 1990

[54] FLAG GENERATION SYSTEM

[75] Inventors: Karl R. Bahnick, Vernon Hills; James H. Johnson, Lake In The Hills, both of Ill.

[73] Assignee: Sun Electric Corporation, Crystal Lake, Ill.

[21] Appl. No.: 148,973

[22] Filed: Jan. 27, 1988

[51] Int. Cl.⁴ .................... G01M 15/00; G06F 15/74
[52] U.S. Cl. .......................... 364/551.01; 364/424.03; 364/431.01
[58] Field of Search ............. 364/431.01, 200, 431.03, 364/431.05, 431.07, 551.01, 424.03

[56] References Cited

U.S. PATENT DOCUMENTS

| | | | |
|---|---|---|---|
| 4,145,746 | 3/1979 | Trussell et al. | 364/551.01 |
| 4,279,002 | 7/1981 | Rider | 371/57 |
| 4,291,382 | 9/1981 | Fall et al. | 364/551 |
| 4,302,815 | 11/1984 | Tedeschi et al. | 364/431.07 |
| 4,393,498 | 7/1983 | Jackson et al. | 371/29 |
| 4,476,531 | 10/1984 | Marino et al. | 364/431.01 |
| 4,532,592 | 7/1985 | Citron et al. | 364/431.07 |
| 4,604,701 | 8/1986 | Fujawa et al. | 364/431.07 |
| 4,625,081 | 11/1986 | Lotito et al. | 379/211 |
| 4,747,047 | 5/1988 | Coogan et al. | 364/200 |
| 4,757,463 | 7/1988 | Ballou et al. | 364/431.11 |

Primary Examiner—Felix D. Gruber
Attorney, Agent, or Firm—Nicholas A. Camasto

[57] ABSTRACT

An engine analyzer includes an A/D converter for sampling analog data from an engine under test and developing digital data consisting of 11 magnitude bits and a sign bit. Four flag bits are added to make a digital word of sixteen bits with the four added bits being equal to the sign bit. Flags are set by making their bit value opposite to that of the sign bit. The sixteen bit words are stored in a RAM memory and the presence of the flags enables ready identification and retrieval of the data.

14 Claims, 4 Drawing Sheets

FIG. 6

FLAG GENERATION SYSTEM

CROSS REFERENCE TO RELATED APPLICATIONS

This invention is related to application Ser. No. 148,972, filed 1/27/88 entitled Flag Identification System and application Ser. No. 148,974, filed 1/27/88 entitled Dual Ported Speed Up Memory, both of which are incorporated by reference herein, and all of which are assigned to Sun Electric Corporation.

BACKGROUND OF THE INVENTION AND PRIOR ART

This invention relates generally to automotive diagnostic equipment and particularly to computer-based equipment for testing and evaluating internal combustion engines.

It is well known in the art of automobile engine testing to utilize computer-based equipment. One such apparatus, identified as the Sun Electric Corporation 2001, is described and claimed in U.S. Pat. No. 4,125,894 issued Nov. 14, 1978, which is hereby incorporated by references. With such equipment, selected engine test signals are gathered by suitable probes connected to the engine. The analog test signals and data are manipulated, processed and compared with factory data for the particular engine or vehicle type and displayed for use of the service technician. Some systems also provide print outs of the test results with evaluation.

One popular diagnostic tester is the recently introduced Sun Electric Corporation Model MCA 3000. That system, includes an IBM compatible PC in addition to the test apparatus that enables the service technician to rapidly acquire and process signals and data from the engine under test. The high speed of the MCA 3000 is due largely to its Data Acquisition System (DAS). With the DAS, analog data obtained from the engine is converted by an analog to digital (A/D) converted and stored in an A/D Random Access Memory (RAM) without the intervention of the main controller. The dual ported A/D RAM that is used for this purpose is the subject of application Ser. No. 148,974. The system controller in the preferred embodiment is an IBM compatible PC having 640 kilobytes of system memory. An additional 118 kilobyte RAM memory is plugged into a card slot normally reserved for a RAM cartridge. It is dual ported, enabling both the DAS and system microprocessor to access it. In accordance with the present invention, the data is stored in the form of digital words and the initiations of certain events are identified by suitable flags added to the data as it is loaded into the A/D memory. In the preferred embodiment the flags are positioned in the higher order bits of the digital word that do not convey magnitude information, i.e. that are beyond the range of magnitudes encountered. It should be apparent however that the flags may occupy any known locations in the digital word with suitable changes in processing. The flags are detected and used to locate and identify the data in the A/D memory. Application Ser. No. 148,972 describes and claims a novel system of identification and removal of the flags in which the data is replaced in memory with the flags reset. In that arrangement the system controller constructs a pointer array in system memory that identifies the addresses of the data in A/D memory. The flags in the data enable rapid access to and retrieval of the data for processing, display etc., in accordance with the selected tests.

The present invention is specifically concerned with the flag generation system for identifying, for ready retrieval, the engine test data. It is thus independent of the inventions in the above-mentioned copending applications, although their use with the invention produces significant benefits.

OBJECTS OF THE INVENTION

A principal object of the invention is to provide a novel data identification system in an automotive diagnostic tester.

Another object of the invention is to provide a simplified data identification system for an automotive diagnostic tester.

A further object of the invention is to provide an improved method and apparatus for acquiring and retrieving automotive test data.

BRIEF DESCRIPTION OF THE DRAWINGS

These and other objects and advantages of the invention will be apparent upon reading the following description in conjunction with the drawings in which:

FIG. 6 illustrates recovery and resetting of flags.

DESCRIPTION OF THE PREFERRED EMBODIMENT

The system described utilizes digital words of sixteen bits, (see FIG. 3) but the invention should not be considered as limited thereto. In the system eleven bits (D0-D10) are used to indicate magnitude, a twelfth bit (D11), called the sign bit, is relocated or transferred to the fifteenth bit (D15) position and the remaining four bits (D11-D14) are available for use as flags. The preferred embodiment will be described in conjunction with generating and recovering or identifying flags used to denote commencement of any cylinder firing event (also sometimes referred to herein as a cylinder #X event) and to denote commencement of a cylinder #1 firing event. It will be appreciated that the cylinder firing order, as well as other parameters of the engine under test, are inputted to the system, either by the service technician or via software, such as a floppy disk media.

Figure 1:
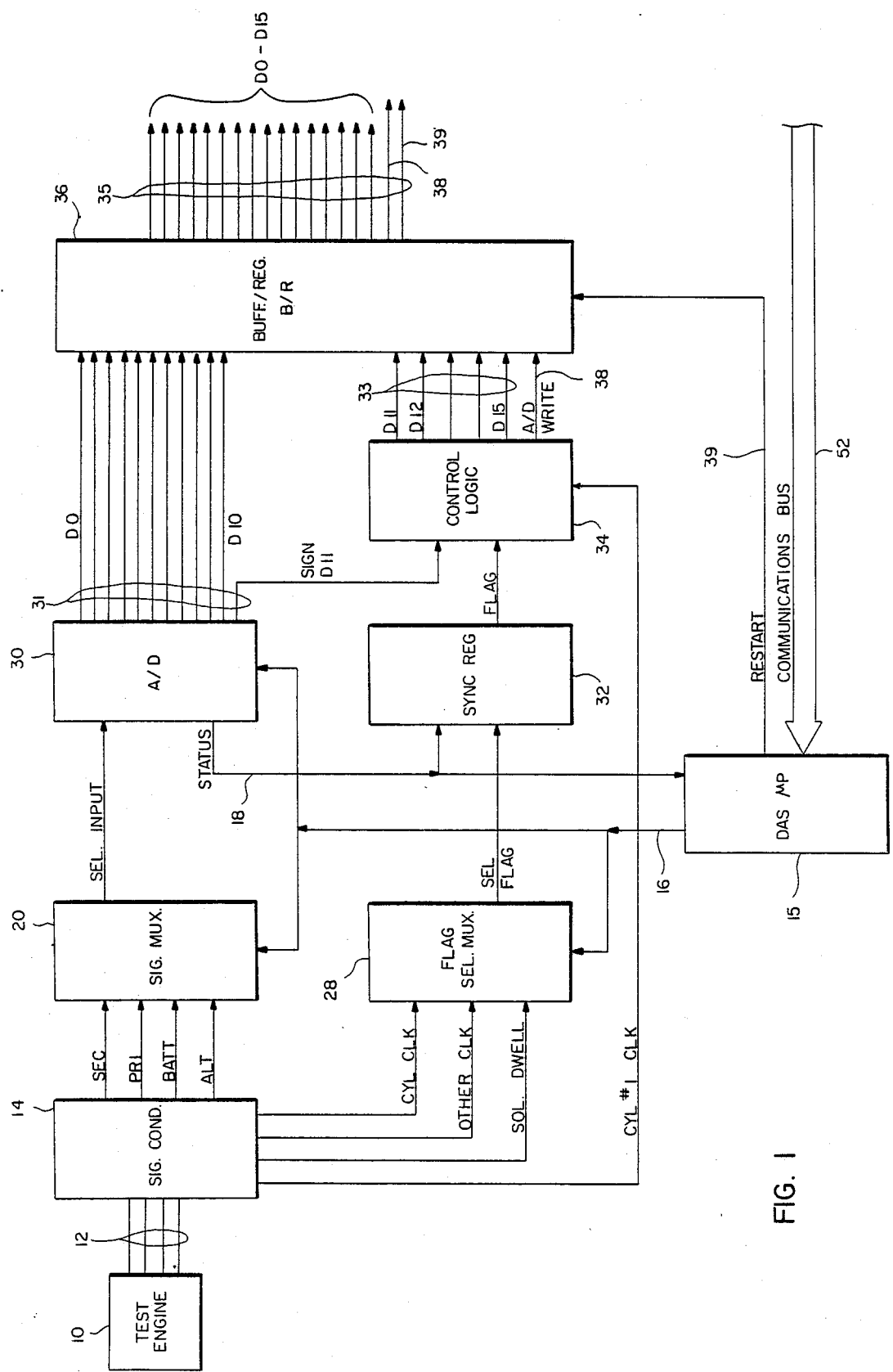
FIG. 1 and FIG. 2 together comprise a block diagram of an automotive diagnostic system utilizing the invention.

In FIG. 1, a test engine is identified by reference numeral 10. A plurality of leads and/or probes 12 is connected to the test engine 10 by the service technician for gathering certain test signals, generally in analog form. The leads 12 are connected to well known signal conditioning apparatus 14, which "cleans up the signals" and develops certain clock signals therefrom. Those indicated are a Cylinder Clock, a Cylinder #1 Clock, an Other Clock, as desired, and a Solenoid Dwell Clock. It will be appreciated that many more signals and data are acquired from the test engine vehicle. Those illustrated are representative only. A plurality of analog signals is supplied from signal conditioner 14 to a signal multiplexer (MUX) 20 that selects which one of the incoming signals is to be supplied, via an output line called selected input, for A/D conversion. This selection is made under control of a DAS microprocessor or controller 15 via a control line 16. The illustrated signals gathered from engine 10 and supplied to MUX 20 are: Primary Ignition; Secondary Ignition; Battery Voltage; and Alternator Current. The clock signals generated by signal conditioner 14 are supplied to a flag selector MUX 28, which is also operated under control of DAS controller 15 via control line 16.

The output of MUX 20 is supplied to an A/D converter 30 which converts the selected analog input signal into 11 bits of data (D0–D10) and a sign bit (D11), all of which are provided on a plurality of output lines 31. The output lines 31 corresponding to bits D0–D10 are connected to a buffer register (B/R) 36 and the output line carrying the sign bit D11 is connected to a control logic block 34. Additionally DAS controller 15 supplies a Restart signal over a line 39 to B/R 36.

Flag select MUX 28 develops a Selected Flag Clock signal at its output. The clock inputs to MUX 28 are a Cylinder Clock, an Other Clock and a Solenoid Dwell Clock. The function of MUX 28 is to provide the Selected Flag Clock signal to a sync register 32. A status line from A/D 30, connected to sync register 32 and to DAS controller 15, apprises controller 15 of when it has completed a conversion. (Controller 15 determines when the requested number of conversions is completed.) The output of sync register 32 is a flag signal that is applied to control logic 34. Other inputs to control logic 34 are the sign bit D11 from A/D 30 and a Cylinder #1 Clock signal from signal conditioner 14. Control logic 34, as will be more fully described, supplies output signals, corresponding to bits D11–D15 and an A/D write signal on a lead 38, to B/R 36. For data that has no flags, bits D11–D15 are all identical, i.e. either all 0's or all 1's. Thus the combination of leads D0–D10 and D11–D15 provides a sixteen bit input to B/R 36. The output of B/R 36 consists of sixteen leads, carrying bits D0–D15, and two leads carrying the A/D write signal and the Restart signal, respectively. B/R 36 is provided since the signals from A/D 30, control logic 34 and DAS controller 15 are at TTL voltage levels, whereas its signal outputs are carried by a ribbon cable 35 in which the signal voltages are preferably between ±12 volts for improved noise immunity. Ribbon Cable 35 may comprise 18 conductors of a larger group of conductors that is terminated in suitable connectors.

Figure 2:
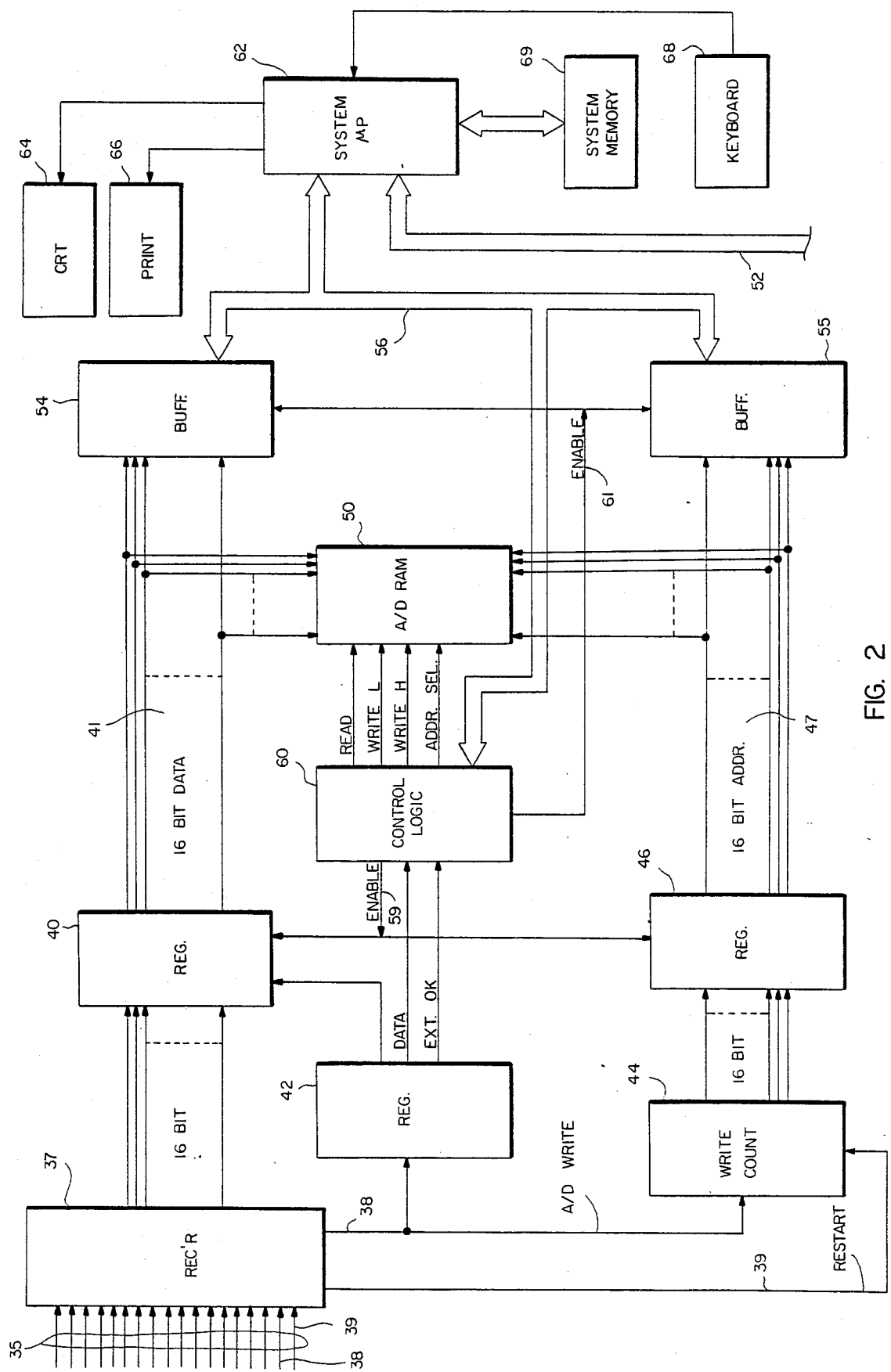

In FIG. 2 the output leads carrying bits D0–D15 and leads 38 and 39 are connected to a receiver 37 where the voltages are transformed back to TTL levels and bits D0–D15 are coupled to a 16 bit register 40. The output of register 40 is carried on a sixteen bit data bus 41 that is connected to an A/D RAM 50 and to a buffer 54. The A/D Write signal on line 38 from receiver 37 is coupled to another register 42 and to a write counter 44. The Restart signal, which acts as a reset, is supplied from receiver 37 to write counter 44. Write counter 44 supplies 16 bits of information to another register 46 which develops the addresses for A/D RAM 50 on a sixteen bit address bus 47. Address bus 47 is connected to another buffer 55 and to A/D RAM 50. Another control logic circuit block 60 receives a Data Available and an External OK signal from register 42 and provides an Enable signal, via a line 59, to registers 40 and 46 and appropriate Read and Write signals and Address Select signals to A/D RAM 50. The buffers 54 and 55 are coupled by a bidirectional communication bus 56 to a system controller 62 and to control logic 60. Operation of buffers 54 and 55 is controlled by another Enable signal from control logic 60 via a line 61. System controller 62 is coupled to DAS controller 15 by another bidirectional communications bus 52. Controller 62 also controls a cathode ray tube raster scan display 64 and a printer 66. A keyboard 68 enables user interface with microprocessor 62 which is also coupled, via a bidirectional bus to a system memory 69.

For convenience in description, it will be understood that a flag is set by making its bit value opposite to that of the sign bit D15. Conversely a flag is reset or removed by making its bit value equal to that of the sign bit D15. It will also be appreciated that the positions of the flags in the preferred embodiment correspond to the higher order bits, but, in the more general case, a flag may occupy any known bit position in the digital word.

Figure 3:
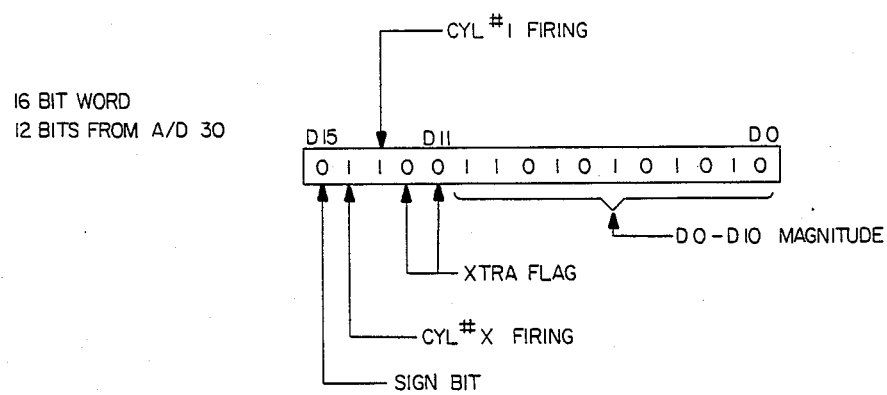
FIG. 3 is a representation of the sixteen bit digital words used in the inventive system.

FIG. 3 illustrates a typical sixteen bit word with bits D0–D10 representing magnitude, bit D15 indicating the sign of the data, flag bits D11 and D12 unset (reset), flag bit D13 set and representing a cylinder #1 firing event (points open) and flag bit D14 set and representing a cylinder #X points open or firing event. It will be appreciated that for other tests, the flags may represent other states, conditions or data. It should also be noted that the system is arranged such that a cylinder #1 flag will not be recognized unless accompanied by a cylinder #X flag. A positive magnitude signal is represented by a sign bit of "0" and a negative magnitude signal is represented by a sign bit of "1". For non-flagged, positive magnitude information, the word in FIG. 3 would have bits D11–D15 all set to "0". Conversely, for negative magnitude non-flagged information bits D11–D15 would all be "1". For a positive magnitude signal with a cylinder #X event, bit D14 is "1" whereas bits D11–D13 and D15 are "0". For a cylinder #1 event, D13 is also "1".

Figure 4:
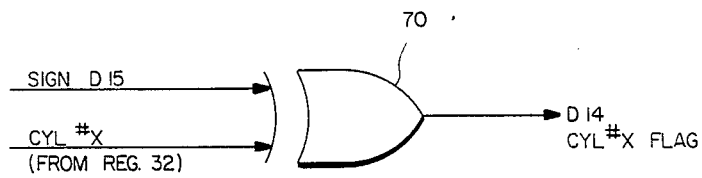
FIG. 4 illustrates circuitry for generating a cylinder firing event flag.

FIG. 4 illustrates how a cylinder #X firing event flag bit (D14) is set to make it opposite to the sign bit. This is accomplished by an exclusive OR gate (XOR) 70 having one input comprising the sign bit D15 and the other input comprising a cylinder #X firing event signal from register 32. The output of XOR 70 represents D14, the cylinder #X flag bit. The characteristics of an XOR are such that its output is high when its input signals differ and is low when its input signals are the same. Thus if the sign bit D15 is "0" (denoting a positive magnitude number) and the cylinder event signal from register 32 is "1" (denoting a cylinder firing event), the output of XOR 70 is "1" and the D14 flag is set, i.e. is made equal to "1" which is opposite of sign bit D15. On the other hand, if there is no cylinder firing event, the output of register 32 is low, as is the sign bit D15, and the output of XOR 70 is also low, indicating that the flag bit D14 is not set.

In operation, the operator or service technician selects the desired test by means of keyboard 68. For the example selected, e.g. secondary voltage waveforms, A/D 30 starts converting on the first Cylinder Clock (points open) condition. Since cylinder #1 is identified and the engine firing order is known, the various cylinder firing events are identified. The analog signals from the test engine are converted into 12 bits of information, (11 bits representing magnitude and one sign bit) by A/D 30. All of the additional four bits may be used for flag selection. These bits are combined with the 12 bits from the A/D 30 to make up the sixteen bit digital words. These words are in turn loaded into A/D RAM 50 under control of address register 46. A/D RAM 50, which has a capacity of 128 kilobytes, may contain about 65,000 conversions of data in sixteen bit words. The information in A/D RAM 50 is a continuous waveform in the sense that no effort is made to compartmentalize the converted data by type as has been necessary in the prior art. For example, in a prior art tester, the various signal data (i.e. the cylinder #1, #2, etc.) was assigned to specific sections of the memory. With the flag system of the invention, the conversions are put into A/D RAM 50 serially and the flags enable that information to be rapidly retrieved based upon the selected tests.

Figure 5:
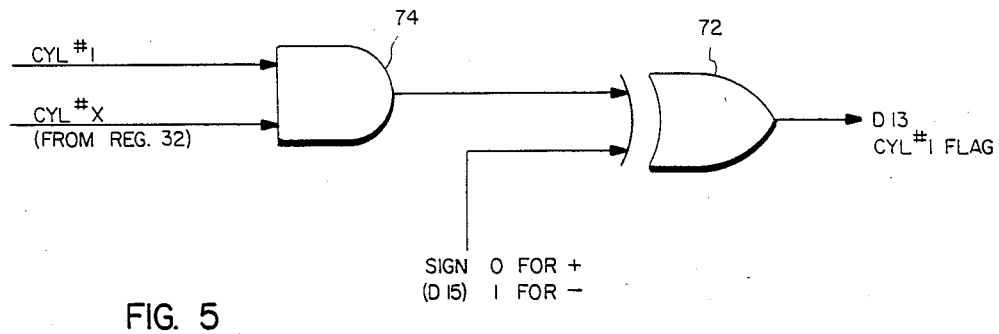
FIG. 5 illustrates circuitry for generating a cylinder #1 firing event flag.

In FIG. 5 the logic arrangement for setting the cylinder #1 flag D13 is shown. An XOR 72 has one input supplied with the sign bit D15 and its other input supplied from the output of an AND gate 74. The inputs to AND 74 are a Cylinder #1 Clock and the cylinder event signal from register 32. AND 74 is provided to assure that the D13 flag is only generated when there is coincidence between a Cylinder #1 Clock signal and a cylinder firing event. Because of the high speed and rapid conversion rate (on the order of 16 microseconds per conversion) of A/D 30, it is possible to have a conversion with a cylinder #1 signal and no cylinder event signal, which is not desirable.

Each conversion is then represented in a sixteen bit address location in A/D RAM 50 with the cylinder firing events and cylinder #1 firing events being flagged by the D13 and D14 data bits. It is a relatively straightforward matter to step through the address locations of the memory to determine whether the D13 and D14 flags have been set and to therefore retrieve that data quite rapidly. Since the system software includes the firing order of the engine under test, when a cylinder #1 event is determined, successive cylinder firing events are immediately known as to the cylinder represented.

In accordance with the invention claimed in copending application Ser. No. 148,972 a parity testing routine is used to very rapidly identify the flags. The parity routine is in software as are the routines for extracting the flags, resetting them by performing AND and XOR operations with appropriate bit masks, and returning the data to memory without flags (i.e. with the flags reset). The software routines thus identify and extract the flags from the digital data stored in A/D RAM 50 and establish pointer arrays identifying the RAM addresses of the flagged words. In the example selected the flags correspond to cylinder #X firings and cylinder #1 firings. The digital data is returned to A/D RAM 50 with the flags reset (removed) so that further processing of the data in A/D RAM 50 can be accomplished rapidly by the system controller 62 since each 16 bit word in RAM 50 represents pure data. Unless the flags are reset, they will affect the magnitude of the stored data and therefore require added system processor time to find and remove them.

In further accordance with S87-10, the data is processed one word at a time by "ANDing" it with a suitable bit mask, i.e. one that leaves only the sign bit D15 and the cylinder #X flag bit D14, and "jumping out" of the loop routine if a "parity ODD" is found (i.e. D15 and D14 are of different value). If a parity ODD is not found, the count of the number of words of A/D memory is decremented by one and the loop is run again until either all words have been tested or another flag is found. If a parity ODD is determined, the address of that word is written into the pointer array established for that flag. An XOR operation, with another bit mask, is performed to clear that flag before returning the word to A/D RAM 50. If more than one flag is being used, (for example a cylinder #X and a cylinder #1 flag) another AND routine with a suitable bit mask is run, followed by a parity EVEN check to determine whether the second flag is present. It will be appreciated that "parity EVEN" is used for code simplification but that parity ODD could also be used. If so, its A/D RAM 50 address is identified in the pointer array established for that flag. The word is again XOR'd with a suitable bit mask to clear the second flag before being written back into A/D RAM 50. The number of flags found is compared to the number of flags needed, as established via the keyboard 68 or the test selected. If more flags are required, the routine is repeated for additional memory locations in A/D RAM 50.

Figure 6:
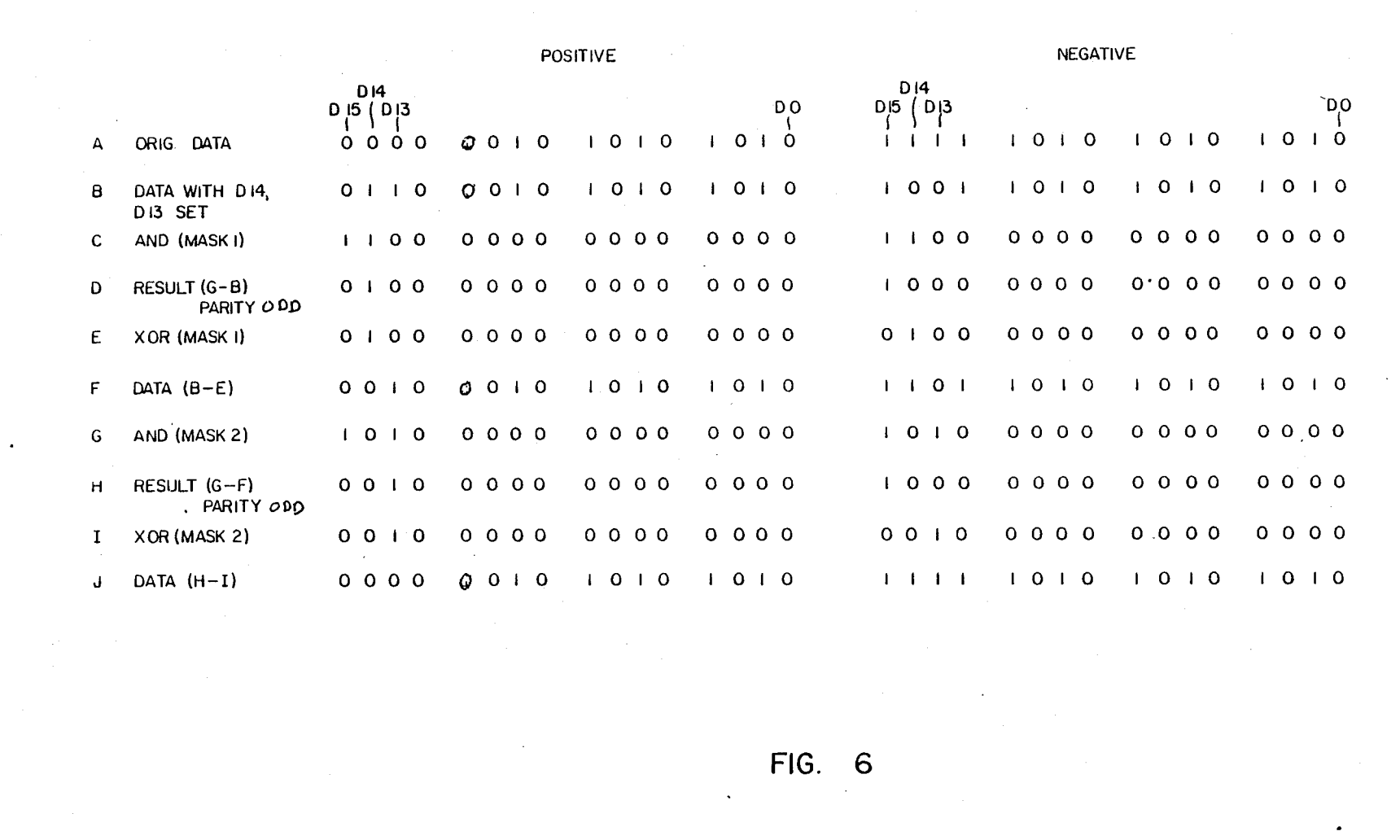

Reference to FIG. 6 will help to clarify the flag identification system. FIG. 6 is divided into two columns, one being for positive magnitude data and another for negative magnitude data. An unflagged data word is shown on line A with bits D15, D14, D13 and D0 identified. On line B, the data word has been altered by setting the D14 and the D13 flags to indicate a cylinder #X firing event and a cylinder #1 firing event, respectively. The first AND bit mask to test for a D14 flag is shown in line C and consists of D15 and D14 being set ("1") and the remainder of the bits being "0". Line D shows the result of ANDing the digital words on lines B and C. At this point the parity test shows a parity ODD condition for both the positive and negative words on line D. That indicates that there is a D14 flag in the word on line B.

The next step is to XOR the data word on line B with a suitable bit mask to reset the D14 flag, as shown on line E where D14 is "1". The result is the data word on line F, which will be seen to correspond to the data word on line B with the D14 flag reset.

To test for a D13 flag, the data word on line F is AND'd with the bit mask on line G consisting of a data word with D15 and D13 being "1" and D14 being "0". Line H shows this result. A parity test is again made, giving a parity ODD result for both the positive and negative data words on line H. It follows that the D13 flag must be reset. To reset the D13 flag, another XOR bit mask is used, as indicated on line I, resulting in a data word on line J that corresponds with the unflagged data word on line A.

Thus, by simply ANDing with bit masks selected for the flags to be identified, running parity tests and XORing with other suitable bit masks, the data word may be returned to AD/RAM 50 with the flags reset, and the location of the flags stored in pointer arrays in system memory. While the example in FIG. 6 is concerned with particular flags, i.e. the cylinder flags, it should be apparent to those skilled in the art that any type of flag can be similarly treated.

The flag system of the invention permits rapid location of data in A/D RAM 50, which is of great benefit when displaying waveforms on the CRT 64. The flag system also permits the DAS to acquire test data apart from the intervention of system microprocessor 62 since the stored data is readily identifiable. A feature of the flags is that with a sixteen bit digital word they are readily incorporated without affecting the magnitude of the word, which is confined to the eleven lower order bits. When used in conjunction with the flag identification invention and dual ported RAM memory of the copending application, a very attractive, high speed, computerized diagnostic engine tester results.

What has been described is a novel system for gathering and identifying test data from an engine under test. It is recognized that numerous modifications and departures from the described invention will be apparent to those skilled in the art without departing from its true spirit and scope. The invention is to be limited only as defined in the claims.

What is claimed is:

1. A method of operating an engine analyzer comprising the steps of:
   developing signal data acquired from an engine under test into digital data of a fixed number of bits;
   adding an identifying digital flag to said digital data in the form of an added bit in a bit position that is different from any of the bit positions of the bits in said fixed number of bits to identify the type of said signal data; and
   storing said signal data and said digital flag in a memory.

2. The method of claim 1 further comprising the step of forming a digital word comprising said digital flag and said digital data for storage in said memory.

3. The method of claim 2 wherein said digital word includes a sign bit denoting the polarity of said signal data and wherein said digital flag is set by making its bit value opposite to that of said sign bit.

4. For use with an engine analyzer:
   means for acquiring signal data from an engine under test;
   means for converting said acquired signal data into a fixed number of digital data bits;
   means for combining a sign bit and one or more flag bits with said digital data to form a digital word; and
   means for setting a flag bit for identifying the type of said signal data by making the bit value of said flag bit opposite to that of said sign bit; and
   means for storing said digital word in a RAM memory.

5. The arrangement of claim 4 wherein said one flag bit identifies a cylinder firing event and further including a second flag bit that identifies a cylinder #1 firing event.

6. The arrangement of claim 5 wherein said digital word has sixteen bit length and said digital data has said sign bit and a magnitude represented by eleven bits.

7. The arrangement of claim 5 wherein said digital word has a sixteen bit length and said digital data has a magnitude represented by twelve bits.

8. A method of operating an engine analyzer comprising the steps of:
   acquiring analog signal data from an engine under test;
   converting the analog signal data into digital data of a fixed number of bits including a sign bit denoting polarity of said signal data;
   adding an identifying digital flag to said digital data in a bit that has a higher order of significance than any of said bits other than said sign bit in said fixed number of bits to identify the type of said analog signal data; and
   storing said digital data and said digital flag in a memory.

9. The method of claim 8 further comprising the step of forming a digital word comprising said digital flag and said digital data for storage in said memory.

10. The method of claim 9 wherein all bits in said digital word that have a higher order of significance than said fixed number of bits have the same sign and wherein said digital flag is represented by reversal of one of said bits having said higher order of significance.

11. The method of claim 10 further including a sign bit in said bits having a higher order of significance to represent a polarity of the digital data, and wherein a flag is set by making its bit value opposite to that of the sign bit.

12. An engine analyzer comprising:
   means for acquiring analog signal data from an engine under test;
   means for converting said analog signal data into digital data bits and a digital sign bit denoting a polarity of said signal data;
   means for developing a digital flag bit identifying the type of said signal data;
   means for combining said digital flag bit, said digital data bits and said digital sign bit into a word with said digital data bits comprising bits having a lower order of significance in said word than said digital flag bit; and
   means for storing said digital word in a RAM memory.

13. The analyzer of claim 12 wherein additional flag bits having the same bit value as the sign bit are included in said digital word and indicate corresponding unset flags and wherein a flag is set by making its bit value opposite to that of the sign bit.

14. A method of operating an engine analyzer comprising the steps of:
   developing signal data acquired from an engine under test into digital data of a fixed number of bits;
   adding one or more redundant bits in bit positions different from any of the bit positions of the bits in said fixed number of bits, to said fixed number of bits to form a digital word;
   selectively reversing one or more of said redundant bits to flag said digital data to identify the type of said signal data; and
   storing said digital words with said flagged digital data in a memory.

* * * * *